US012670909B2

(12) United States Patent
Aher et al.

(10) Patent No.: US 12,670,909 B2
(45) Date of Patent: \*Jun. 30, 2026

(54) SYSTEMS AND METHODS FOR DISAMBIGUATING A VOICE SEARCH QUERY

(71) Applicant: Adeia Guides Inc., San Jose, CA (US)

(72) Inventors: Ankur Aher, Kalyan (IN); Sindhuja Chonat Sri, Coimbatore (IN); Aman Puniyani, Bangalore (IN); Nishchit Mahajan, Amritsar (IN)

(73) Assignee: Adeia Guides Inc., San Jose, CA (US)

( * ) Notice: Subject to any disclaimer, the term of this patent is extended or adjusted under 35 U.S.C. 154(b) by 135 days.

This patent is subject to a terminal disclaimer.

(21) Appl. No.: 18/828,772

(22) Filed: Sep. 9, 2024

(65) Prior Publication Data

US 2024/0428795 A1     Dec. 26, 2024

Related U.S. Application Data

(63) Continuation of application No. 18/368,214, filed on Sep. 14, 2023, now Pat. No. 12,119,001, which is a
(Continued)

(51) Int. Cl.
| | |
|---|---|
| *G10L 15/22* | (2006.01) |
| *G06F 16/635* | (2019.01) |

(Continued)

(52) U.S. Cl.
CPC ............ *G10L 15/22* (2013.01); *G06F 16/635* (2019.01); *G06F 16/638* (2019.01); *G06F 16/683* (2019.01); *G10L 15/08* (2013.01); *G10L 25/51* (2013.01); *G10L 2015/088* (2013.01); *G10L 2015/223* (2013.01)

(58) Field of Classification Search
CPC ......... G10L 15/22; G10L 15/08; G10L 25/51; G10L 2015/088; G10L 2015/223; G06F 16/635; G06F 16/638; G06F 16/683; G06F 16/685; G06F 16/3329
See application file for complete search history.

(56) References Cited

U.S. PATENT DOCUMENTS

| | | | |
|---|---|---|---|
| 11,133,005 | B2 | 9/2021 | Aher et al. |
| 11,626,113 | B2 | 4/2023 | Aher et al. |

(Continued)

*Primary Examiner* — Anne L Thomas-Homescu
(74) *Attorney, Agent, or Firm* — HG LAW LLP

(57) ABSTRACT

Systems and methods are described herein for disambiguating a voice search query that contains a command keyword by determining whether the user spoke a quotation from a content item and whether the user mimicked or approximated the way the quotation is spoken in the content item. The voice search query is transcribed into a string, and an audio signature of the voice search query is identified. Metadata of a quotation matching the string is retrieved from a database that includes audio signature information for the string as spoken within the content item. The audio signature of the voice search query is compared with the audio signature information in the metadata to determine whether the audio signature matches the audio signature information in the quotation metadata. If a match is detected, then a search result comprising an identifier of the content item from which the quotation comes is generated.

18 Claims, 13 Drawing Sheets

Related U.S. Application Data continuation of application No. 18/118,343, filed on Mar. 7, 2023, now Pat. No. 11,790,915, which is a continuation of application No. 17/412,924, filed on Aug. 26, 2021, now Pat. No. 11,626,113, which is a continuation of application No. 16/397,004, filed on Apr. 29, 2019, now Pat. No. 11,133,005.

(51) Int. Cl.

| | |
|---|---|
| *G06F 16/638* | (2019.01) |
| *G06F 16/683* | (2019.01) |
| *G10L 15/08* | (2006.01) |
| *G10L 25/51* | (2013.01) |

(56) References Cited

U.S. PATENT DOCUMENTS

| | | | |
|---|---|---|---|
| 11,790,915 B2 | 10/2023 | Aher et al. | |
| 2002/0039098 A1 | 4/2002 | Hirota | |
| 2003/0023444 A1 | 1/2003 | St. John | |
| 2005/0038819 A1 | 2/2005 | Hicken et al. | |
| 2007/0106685 A1 | 5/2007 | Houh et al. | |
| 2008/0140420 A1 | 6/2008 | Lee | |
| 2010/0241963 A1* | 9/2010 | Kulis | G06F 16/685 |
| | | | 707/706 |
| 2011/0145214 A1* | 6/2011 | Zhang | G06F 16/957 |
| | | | 707/706 |
| 2011/0223893 A1 | 9/2011 | Lau et al. | |
| 2011/0289098 A1 | 11/2011 | Oztaskent et al. | |
| 2014/0259041 A1 | 9/2014 | Sharifi | |
| 2015/0199967 A1 | 7/2015 | Reddy et al. | |
| 2016/0005410 A1 | 1/2016 | Parilov | |
| 2016/0098998 A1 | 4/2016 | Wang et al. | |
| 2016/0125889 A1 | 5/2016 | Westerman | |
| 2016/0275588 A1 | 9/2016 | Ye et al. | |
| 2016/0285924 A1 | 9/2016 | Dirga et al. | |
| 2016/0293164 A1 | 10/2016 | Shi et al. | |
| 2018/0097836 A1 | 4/2018 | Stolarz et al. | |
| 2018/0167490 A1 | 6/2018 | Morton et al. | |
| 2018/0330728 A1* | 11/2018 | Gruenstein | G10L 15/08 |
| 2019/0037257 A1 | 1/2019 | Nelson et al. | |
| 2019/0037298 A1* | 1/2019 | Reily | H04R 1/1041 |
| 2019/0129957 A1* | 5/2019 | Raikar | H04N 21/8456 |
| 2019/0280996 A1* | 9/2019 | Dahir | H04L 51/046 |
| 2019/0362022 A1* | 11/2019 | Haukioja | G10L 15/04 |
| 2019/0373309 A1 | 12/2019 | Fahnestock et al. | |
| 2020/0034764 A1 | 1/2020 | Panuganty | |
| 2020/0075026 A1 | 3/2020 | Peeler et al. | |
| 2020/0105286 A1 | 4/2020 | Sen et al. | |
| 2020/0135224 A1 | 4/2020 | Bromand et al. | |
| 2020/0210647 A1 | 7/2020 | Panuganty et al. | |
| 2020/0221181 A1 | 7/2020 | Gupta et al. | |
| 2020/0226208 A1 | 7/2020 | Subramanian et al. | |
| 2020/0251104 A1 | 8/2020 | Smith et al. | |
| 2020/0304755 A1 | 9/2020 | Narayan et al. | |
| 2020/0342859 A1 | 10/2020 | Aher et al. | |
| 2020/0365136 A1 | 11/2020 | Candelore et al. | |
| 2020/0402153 A1* | 12/2020 | Minkus | G10L 15/22 |
| 2021/0390954 A1 | 12/2021 | Aher et al. | |
| 2023/0206920 A1 | 6/2023 | Aher et al. | |
| 2024/0005923 A1 | 1/2024 | Aher et al. | |

* cited by examiner

300

Voice Input {
302 — String: show me the money
304 — Volume: 4
306 — Tone: Intimidating
308 — Word Emphasis {
        show: 3 — 308a
        me: 3 — 308b
        the: 3 — 308c
        money: 4 — 308d
    }
310 — Word Duration {
        show: 350 — 310a
        me: 120 — 310b
        the: 300 — 310c
        money: 550 — 310d
    }
312 — Altered Voice: True
}

314

Quotation {
316 — String: show me the money
318 — Volume: 5
320 — Tone: Intimidating
322 — Word Emphasis {
322a — show: 3
322b — me: 3
322c — the: 3
322d — money: 5
    }
324 — Word Duration {
324a — show: 300
324b — me: 100
324c — the: 250
324d — money: 600
    }
326 — Source: Jerry Maguire
}

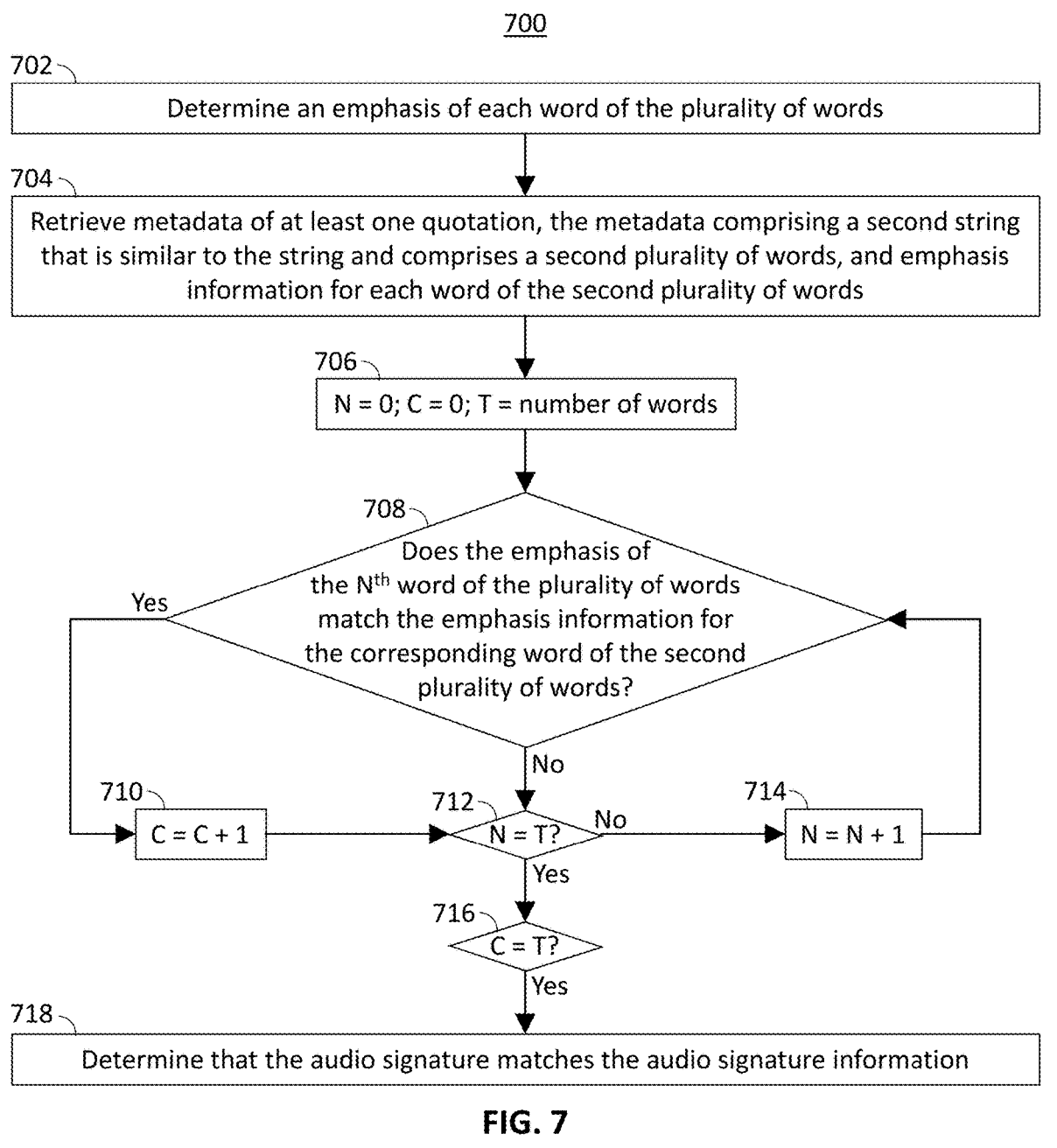

700

702
Determine an emphasis of each word of the plurality of words

704
Retrieve metadata of at least one quotation, the metadata comprising a second string that is similar to the string and comprises a second plurality of words, and emphasis information for each word of the second plurality of words 706
N = 0; C = 0; T = number of words 708
Does the emphasis of the $N^{th}$ word of the plurality of words match the emphasis information for the corresponding word of the second plurality of words?

Yes

No

710
C = C + 1

712
N = T?

No

714
N = N + 1

Yes

716
C = T?

Yes

718
Determine that the audio signature matches the audio signature information

FIG. 7

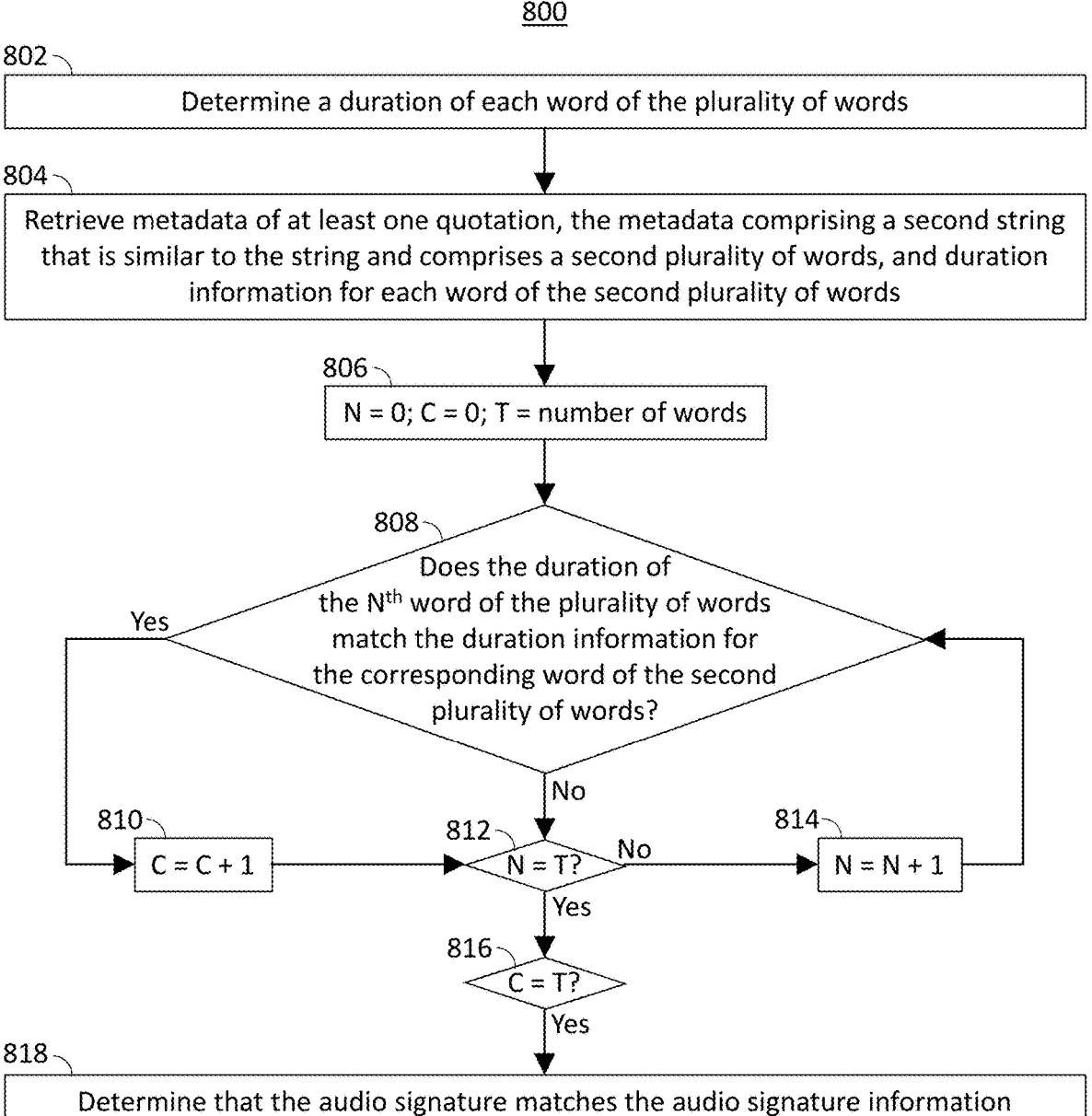

800

802
Determine a duration of each word of the plurality of words

804
Retrieve metadata of at least one quotation, the metadata comprising a second string that is similar to the string and comprises a second plurality of words, and duration information for each word of the second plurality of words 806
N = 0; C = 0; T = number of words 808
Does the duration of the $N^{th}$ word of the plurality of words match the duration information for the corresponding word of the second plurality of words?

Yes

No

810
C = C + 1

812
N = T?

No

814
N = N + 1

Yes

816
C = T?

Yes

818
Determine that the audio signature matches the audio signature information

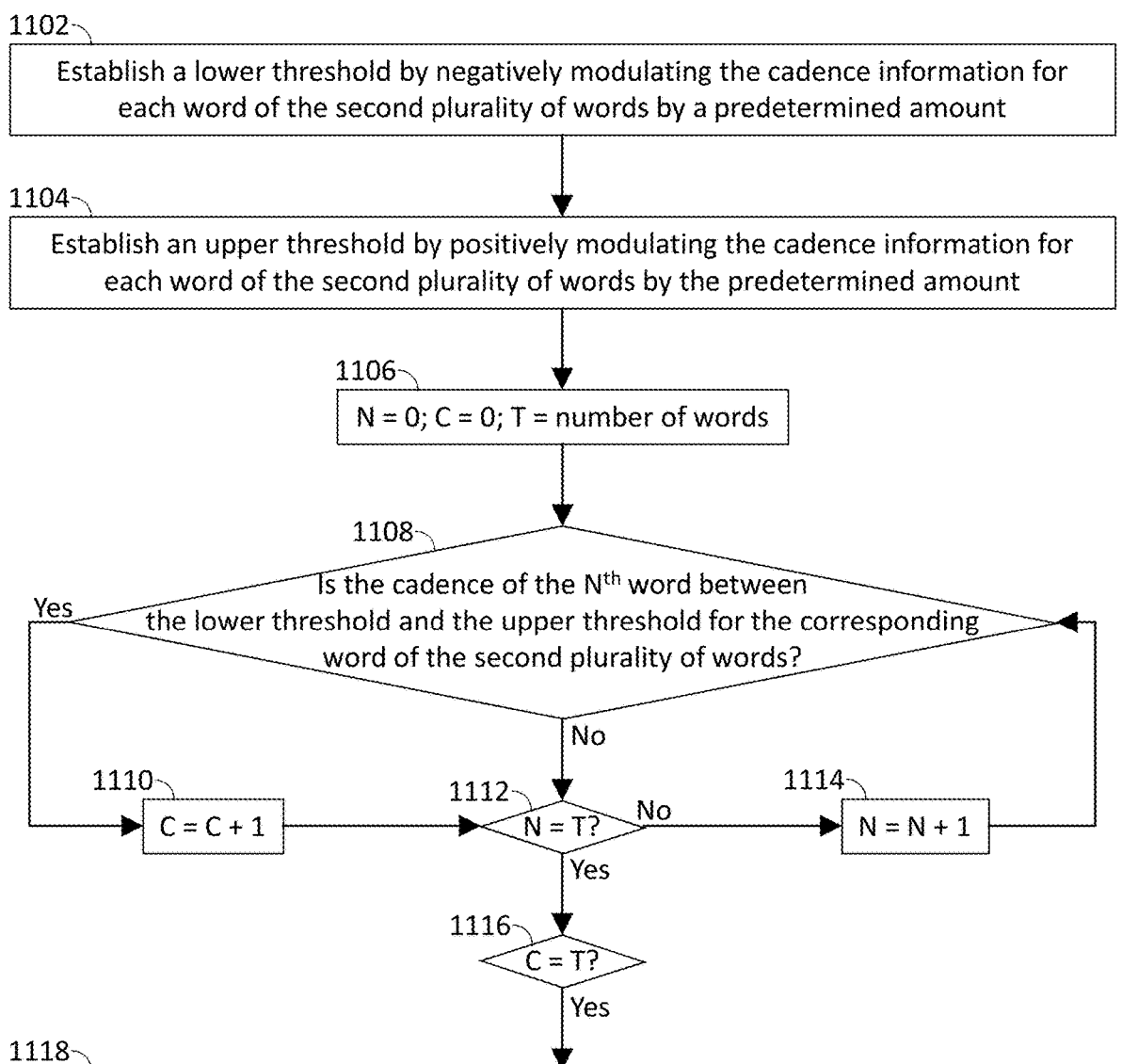

1102
Establish a lower threshold by negatively modulating the cadence information for each word of the second plurality of words by a predetermined amount 1104
Establish an upper threshold by positively modulating the cadence information for each word of the second plurality of words by the predetermined amount 1106
N = 0; C = 0; T = number of words 1108
Is the cadence of the $N^{th}$ word between the lower threshold and the upper threshold for the corresponding word of the second plurality of words?

Yes

No

1110
C = C + 1

1112
N = T?

No

1114
N = N + 1

Yes

1116
C = T?

Yes

1118
Determine that the cadence of each word matches the cadence information for each corresponding word of the second plurality of words

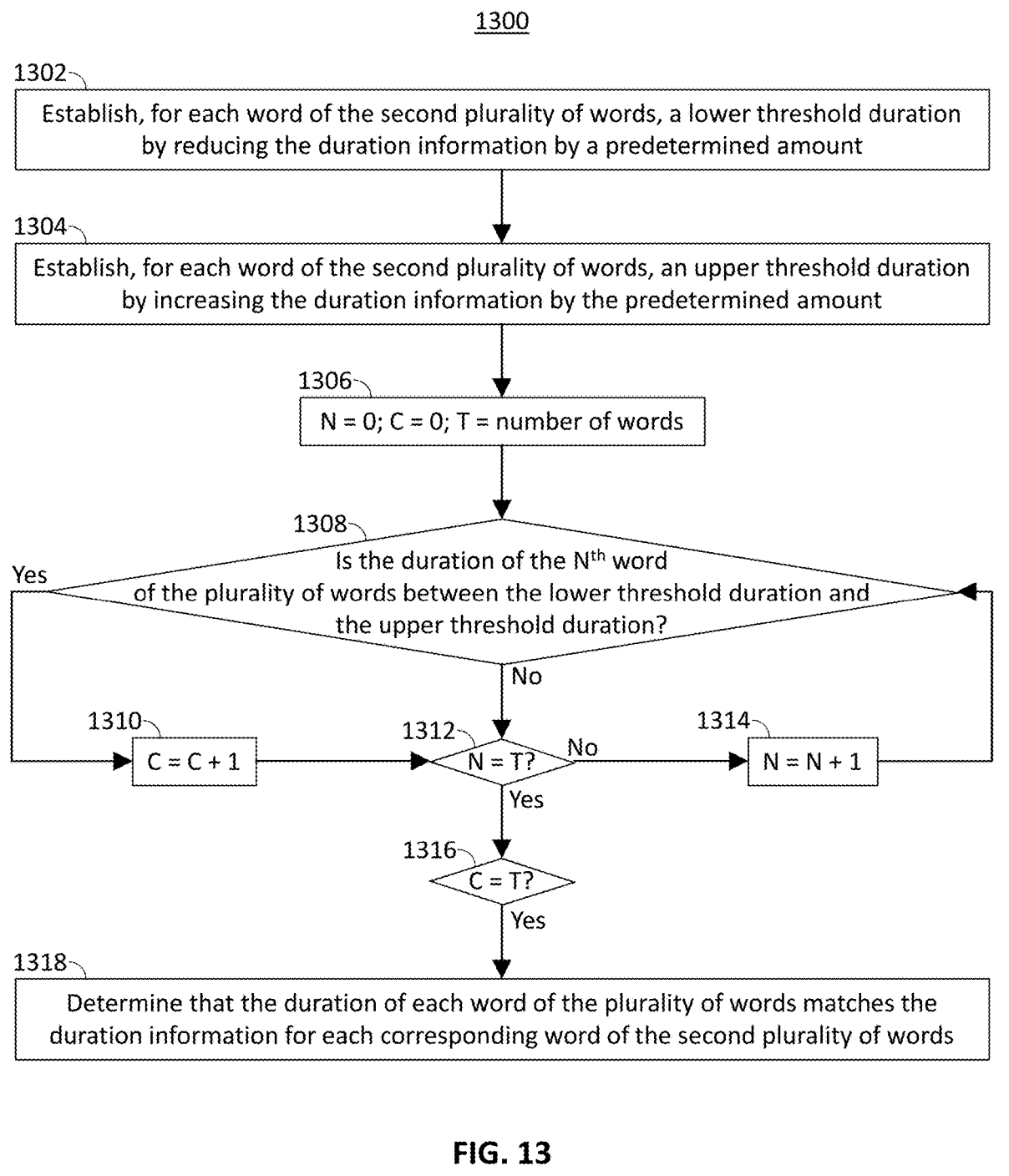

Establish, for each word of the second plurality of words, a lower threshold duration by reducing the duration information by a predetermined amount

1304 —

Establish, for each word of the second plurality of words, an upper threshold duration by increasing the duration information by the predetermined amount

1306 —

$N = 0; C = 0; T$ = number of words

1308 —

Yes

Is the duration of the $N^{th}$ word of the plurality of words between the lower threshold duration and the upper threshold duration?

No

1310 —

$C = C + 1$

1312 —

$N = T?$

No

1314 —

$N = N + 1$

Yes

1316 —

$C = T?$

Yes

1318 —

Determine that the duration of each word of the plurality of words matches the duration information for each corresponding word of the second plurality of words

FIG. 13

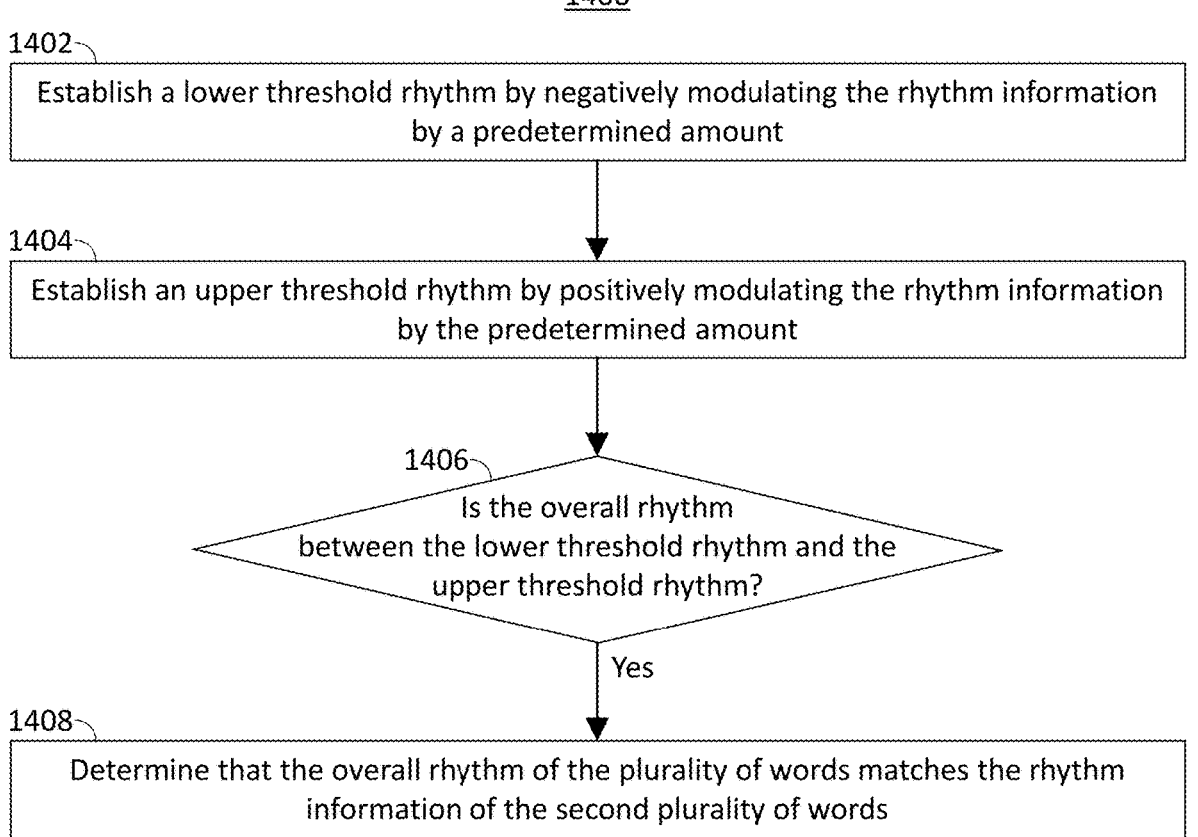

1400

1402

Establish a lower threshold rhythm by negatively modulating the rhythm information by a predetermined amount

1404

Establish an upper threshold rhythm by positively modulating the rhythm information by the predetermined amount

1406

Is the overall rhythm between the lower threshold rhythm and the upper threshold rhythm?

Yes

1408

Determine that the overall rhythm of the plurality of words matches the rhythm information of the second plurality of words

FIG. 14

SYSTEMS AND METHODS FOR DISAMBIGUATING A VOICE SEARCH QUERY

CROSS-REFERENCE TO RELATED APPLICATIONS

This application is a continuation of U.S. patent application Ser. No. 18/368,214, filed Sep. 14, 2023, which is a continuation of U.S. patent application Ser. No. 18/118,343, filed Mar. 7, 2023, now U.S. Pat. No. 11,790,915, which is a continuation of U.S. patent application Ser. No. 17/412, 924, filed Aug. 26, 2021, now U.S. Pat. No. 11,626,113, which is a continuation of U.S. patent application Ser. No. 16/397,004, filed Apr. 29, 2019, now U.S. Pat. No. 11,133, 005, which are hereby incorporated by reference herein in their entireties.

BACKGROUND

The present disclosure relates to providing search results and, more particularly, disambiguation of a voice search query based on audio properties of the voice input.

SUMMARY

Voice search applications on content platforms allow the user to search for content using voice commands. Using command keywords in conjunction with search parameters, the user can instruct the application to perform a search query for particular content items. Users can also use a famous quote from a particular content item as a search query for that content item. When quotes contain command keywords, however, the application may not recognize that the user is attempting to search for the particular content item from which the quote comes and instead performs a search using the words of the quote that follow the recognized command keyword.

Systems and methods are described herein for disambiguating a voice search query that contains a command keyword by determining whether the user spoke a quotation from a content item and whether the user mimicked or approximated the way the quotation is spoken in the content item. If so, a search result comprising an identifier of the content item is generated. The voice search query may also be processed based on the command keyword, which may return a number of search results. The search result representing the content item from which the quotation comes may be ranked highest among the search results returned and therefore presented first in a list of search results. If the user did not mimic or approximate the way the quotation is spoken in the content time, then a search result may not be generated for the content item or may be ranked lowest among other search results.

Upon receiving the voice search query, the system transcribes the voice search query into a string of text. An audio signature of the voice search query is also identified. A query is made to a database of quotations using the string. Metadata of a quotation matching the string is received in response to the query. The metadata includes audio signature information for the string as spoken within the content item and an identifier of the content item from which the quotation comes. The audio signature of the voice search query is compared with the audio signature information in the metadata of the content item, and the system determines whether the audio signature of the voice search query matches the audio signature information in the quotation metadata. If a match is detected, then a search result comprising an identifier of the content item from which the quotation comes is generated. The system may establish upper and lower thresholds of similarity by transposing the audio signature information in a positive direction and negative direction, respectively, by a predetermined amount. The system determines that the audio signature matches the audio signature information if the audio signature falls between the upper and lower thresholds.

As part of determining whether the audio signature of the voice search query matches the audio signature information in the quotation metadata, a cadence of each word in the voice search query may be determined. The system compares the cadence of each word with cadence information in the metadata to determine whether the voice search query was spoken with identical or similar cadence to that with which the words are spoken in the content item. If so, the system determines that the audio signature matches the audio signature information in the quotation metadata. The system may establish upper and lower thresholds of similarity by modulating the cadence information in a positive direction and a negative direction, respectively, by a predetermined amount. The system determines that the cadence of each word matches the cadence information for the corresponding word if the cadence falls between the upper and lower thresholds.

The system may, alternatively or additionally, analyze emphasis placed on each word in the voice search query and compare the relative emphasis of each word with relative emphasis information in the quotation metadata. If the relative emphasis placed on each word of the voice search query is identical or similar to that with which the words are spoken in the content item, the system determines that the audio signature matches the audio signature information in the quotation metadata.

The system may also analyze the duration of each word in the voice search query and compare the duration of each word with duration information of each word in the quotation metadata. If the duration of each word is identical or similar to that of each word as spoken in the content item, the system determines that the audio signature matches the audio signature information in the quotation metadata. The system may establish upper and lower thresholds of similarity increasing and decreasing the duration information, respectively, by a predetermined amount. The system determines that the duration matches the duration information if the duration falls between the upper and lower thresholds.

The overall rhythm of the words spoken in the voice search query may also be analyzed and compared with rhythm information in the metadata of a content item. If the rhythm is identical or similar to the rhythm information, the system determines that the audio signature matches the audio signature information in the quotation metadata. The system may establish upper and lower thresholds of similarity by modulating the rhythm information in a positive direction and a negative direction, respectively, by a predetermined amount. The system determines that the rhythm matches the rhythm information in the quotation metadata if the rhythm falls between the upper and lower thresholds.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 7 is a flowchart representing a second process for determining whether an audio signature matches audio signature information, in accordance with some embodiments of the disclosure;

FIG. 8 is a flowchart representing a third process for determining whether an audio signature matches audio signature information, in accordance with some embodiments of the disclosure;

FIG. 11 is a flowchart representing a process for determining whether a cadence of each word of a plurality of words matches cadence information for each corresponding word of a second plurality of words, in accordance with some embodiments of the disclosure;

FIG. 13 is a flowchart representing a process for determining whether a duration of each word of a plurality of words matches duration information for each corresponding word of a second plurality of words, in accordance with some embodiments of the disclosure; and FIG. 14 is a flowchart representing a process for determining whether the overall rhythm of a plurality of words matches rhythm information for a second plurality of words, in accordance with some embodiments of the disclosure.

DETAILED DESCRIPTION

Voice-based search applications are optimized for natural language input. Certain words or phrases are designated as command keywords, which inform the application of what function the user wants to activate. For example, in natural language, the user may say "Show me" or "I want to see," followed by the title of a particular content item or a description of the type of content the user wishes to search for. The application therefore designates "Show me" and "I want to see" as command keywords indicating that the application should perform a search on the words that immediately follow the command keyword. Thus, if the user says "Show me the money," the application will search for content entitled "the money." However, the user may say "Show me the money" in a way that mimics how actors Tom Cruise and Cuba Gooding Jr. say the phrase in the movie "Jerry Maguire," which indicates that the user wants to see that movie. The application compares an audio signature of the voice search with audio signature information of content items with known quotations matching the words of the voice search. If the audio signature of the voice search is the same as or similar to the audio signature information of a content item, the application generates a search result for that particular content item. In some embodiments, the application may assign a confidence score to the content item and perform a regular content search based on the voice input as well, assigning a confidence score to each resulting content item. The application then generates search results for the content items having the highest confidence scores. If the audio signature of the voice search is different from the audio signature information or is extremely consistent throughout, the application may assign a lowest confidence score to the content item from which the quotation comes.

Figure 1:
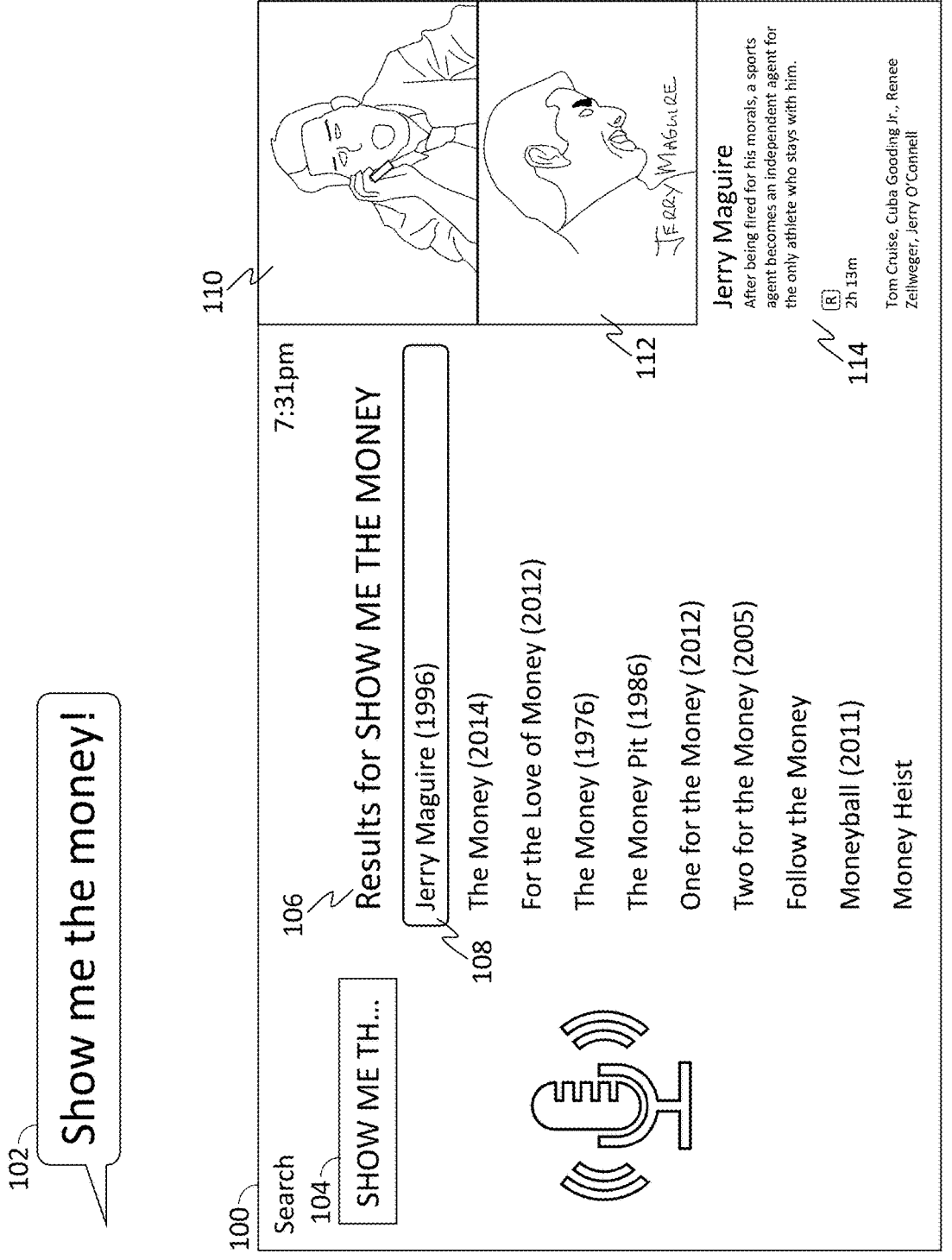
FIG. 1 shows an exemplary search interface, in accordance with some embodiments of the disclosure.

FIG. 1 shows an exemplary search interface 100, according to some embodiments of the disclosure. The search application receives the voice search query 102 comprising the words "Show me the money!" The application transcribes the voice search query 102 into a string of text 104 (displayed in a truncated fashion in FIG. 1). The application queries a database for content items matching text 104, and content items with known quotations matching or similar to text 104. The application receives, in response to the query, metadata of at least one quotation. Included in the metadata of each quotation is audio signature information for the quotation. The application compares an audio signature of the voice search query with the audio signature information in the metadata of each quotation. To account for variations in user vocal patterns, and accuracy of user memory and mimicry of the quotation, the application may establish upper and lower thresholds of similarity. The upper threshold is established by scaling, modulating, and/or transposing parameters of the audio signature information in a positive direction. For example, increasing the pitch, tone, or speed of the audio signature. Similarly, the lower threshold is established by scaling, modulating, and/or transposing the parameters of the audio signature in a negative direction. The application then determines whether each corresponding parameter of the audio signature of the voice search query is between the upper and lower thresholds. If so, the application determines that the voice search query comprises the quotation and generates, as the first result of a plurality of search results 106, a search result 108 comprising an identifier of the content item from which the quotation comes. For example, if the audio signature of the voice search query indicates that the user said "Show me the money!" in a way that is similar to how actors Tom Cruise and Cuba Gooding Jr. say the phrase in the movie "Jerry Maguire," the application generates a search result 108 for the movie "Jerry Maguire." The application also generates for display a still image 110 from the movie of a scene in which the quotation is said, as well as a thumbnail image 112 representing the movie and summary information 114 describing the movie. Search results may be ordered based on rank, where higher ranks are associated with matches closer to the search string. In some embodiments, search result 108 may be ranked highest among all search results. If the audio signature of the voice search query indicates that the user did not say the quotation in a way that is similar to how the actors say the phrase, a search result for "Jerry Maguire" may not be generated, or may be ranked lower among the search results.

Figure 2:
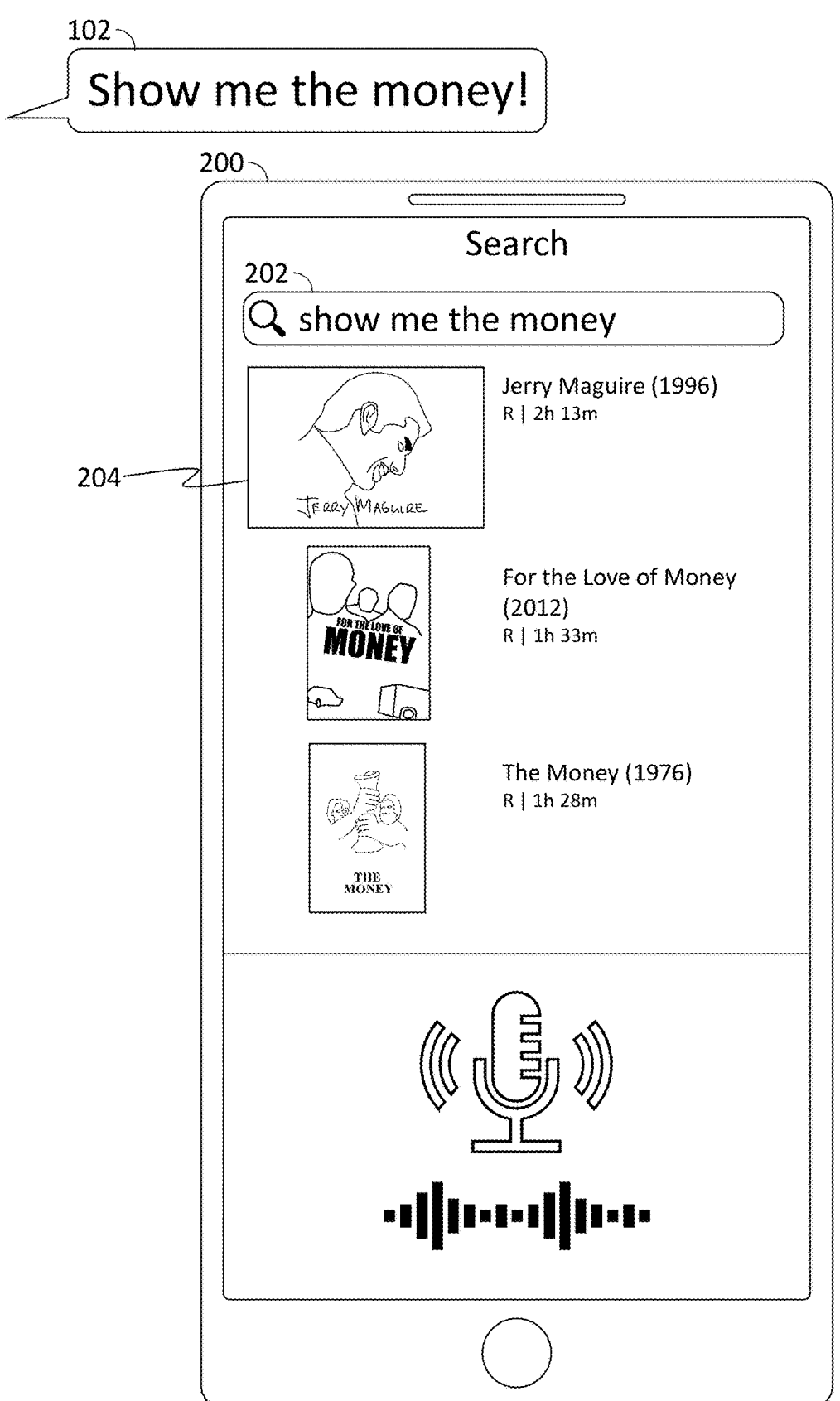
FIG. 2 shows another exemplary search interface, in accordance with some embodiments of the disclosure.

FIG. 2 shows another exemplary search interface presented on a mobile device 200, in accordance with some embodiments of the disclosure. Mobile device 200 receives voice search query 102 and displays the transcribed text of the voice search query in search box 202. A thumbnail image 204 of the movie "Jerry Maguire" is displayed as the first search result in response to voice search query 102.

Figure 3:
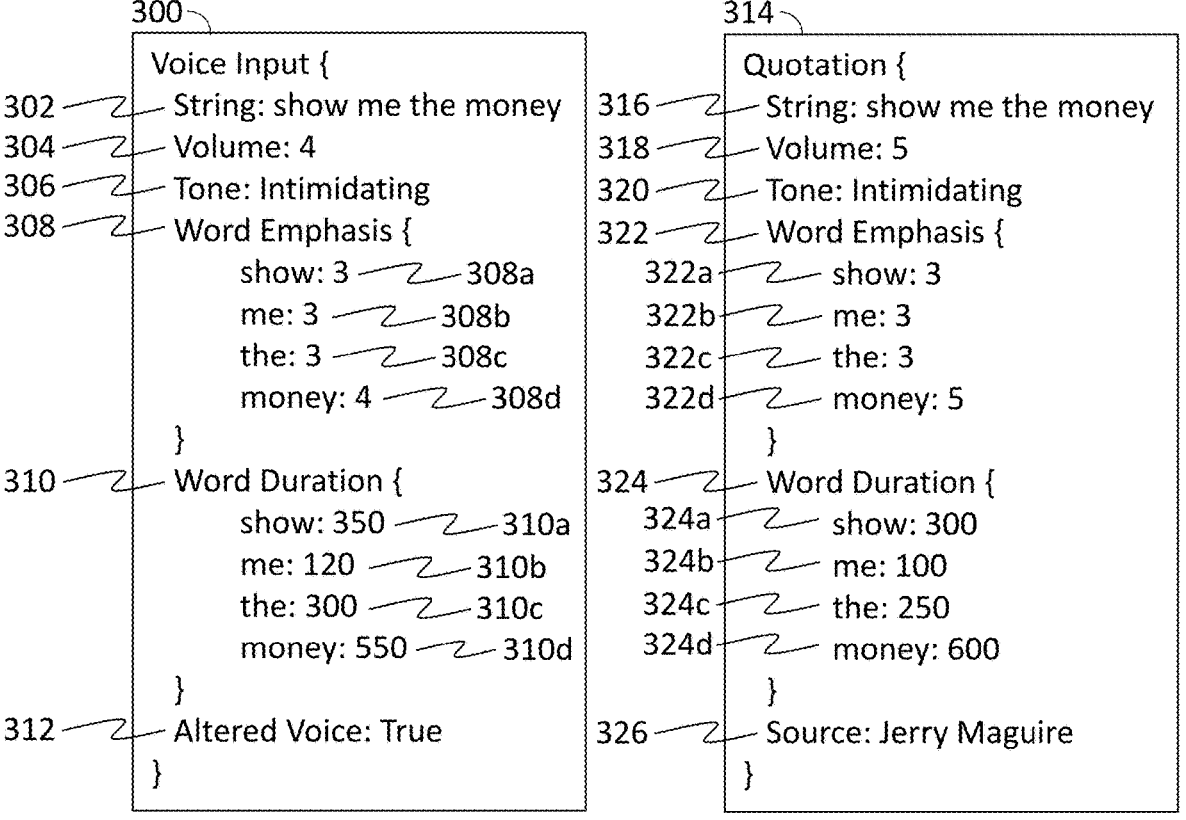
FIG. 3 shows exemplary voice search data and quotation metadata to be compared, in accordance with some embodiments of the disclosure.

FIG. 3 shows exemplary voice search data and quotation metadata to be compared, in accordance with some embodiments of the disclosure. Voice search data 300 represents the text 302 and audio signature parameters 304, 306, 308, 310, and 312 of the voice search query 102. Volume parameter 304 represents a scaled volume level at which the user spoke the voice search query. The volume level may be scaled based on an absolute decibel level or by comparing the volume level with an average volume level at which the user speaks based on a voice profile of the user. Tone parameter 306 indicates an emotion corresponding to the way in which the user spoke the voice query. The tone may be determined by analyzing the volume, speed, emphasis and other factors related to how the user spoke the voice search query.

Word emphasis parameter 308 indicates a relative emphasis of each word of the transcribed string 302. Continuing the above example, the string "show me the money" contains four words, and the emphasis placed on each word is represented by a corresponding entry 308a, 308b, 308c, and 308d in word emphasis parameter 308. Similarly, word duration parameter 310 indicates the duration of each word, for example in milliseconds, with each word of the transcribed string 302 having a corresponding entry 310a, 310b, 310c, and 310d in word duration parameter 310.

The application may compare the audio signature to a vocal profile of the user to determine whether the user has spoken the voice search query using an altered voice. For example, the user may attempt to mimic the sound of an Tom Cruise's voice when saying "Show me the money." The altered voice parameter 312 indicates whether the user has altered his or her voice when speaking the voice search query.

Quotation metadata 314 represents information about the quotation, including string information 316, volume parameter 318, tone parameter 320, word emphasis parameter 322 including entries 322a, 322b, 322c, and 322d, and word duration parameter 324 including entries 324a, 324b, 324c, and 324d. The application compares these parameters with the corresponding parameters of the voice search data 300 to determine whether the user said the quotation. Quotation metadata 314 also includes source identifier 326 identifying the content item from which the quotation comes.

Figure 4:
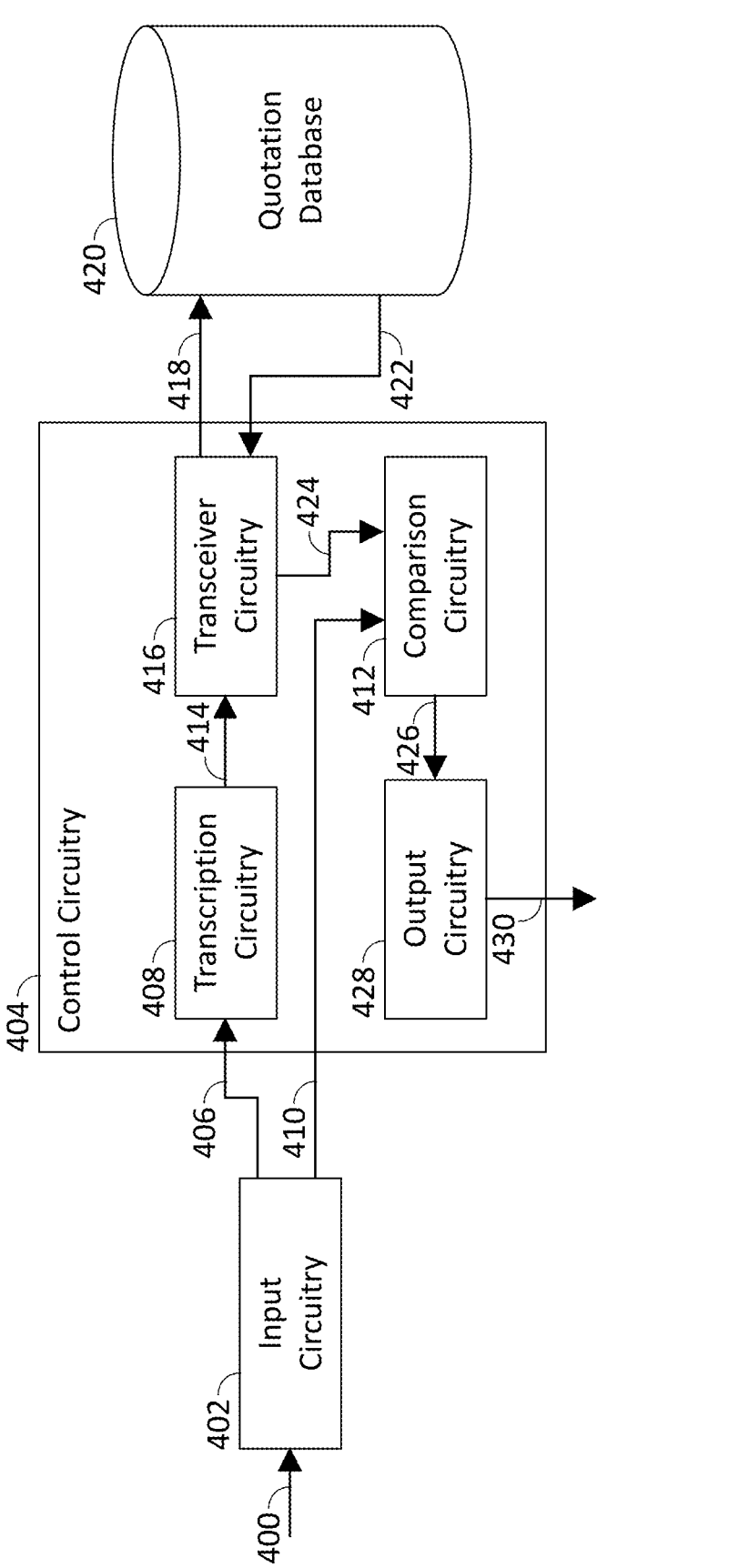
FIG. 4 is a block diagram representing control circuitry, components, and data flow therebetween for disambiguating a voice search query, in accordance with some embodiments of the disclosure.

FIG. 4 is a block diagram representing control circuitry, components, and data flow therebetween for disambiguating a voice search query, in accordance with some embodiments of the disclosure. Voice input 400 (e.g., voice search query 102) is received using input circuitry 402. Input circuitry 402 may be a data interface such as a Bluetooth module, WiFi module, or other suitable data interface through which audio data captured by another device can be received. Alternatively, input circuitry 402 may be a microphone through which audio information is captured directly. Input circuitry 402 may convert the audio to a digital format such as WAV. Input circuitry 402 communicates voice input 400 to control circuitry 404. Control circuitry 404 may be based on one or more microprocessors, microcontrollers, digital signal processors, programmable logic devices, field-programmable gate arrays (FPGAs), application specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Input circuitry 402 transfers 406 voice input 400 to transcription circuitry 408 of control circuitry 404. Transcription circuitry 408 comprises speech-to-text circuitry and/or programming which transcribes voice input 400 into a string of text (e.g., text 104, string 302). Input circuitry 402 also communicates 410 voice input 400 to comparison circuitry 412 of control circuitry 404. Comparison circuitry 412 compares the audio signature of voice input 400 with audio signature information in metadata of at least one content item.

Transcription circuitry 408 transfers 414 the string to transceiver circuitry 416. Transceiver circuitry 416 may be a network connection such as an Ethernet port, WiFi module, or any other data connection suitable for communicating with a remote server. Transceiver circuitry transmits 418 a query to quotation database 420 for quotations which match the string. The query may be an SQL "SELECT" command, or any other suitable query format. Transceiver circuitry 416 receives 422, in response to the query, quotation metadata from quotation database 420. Transceiver circuitry 416 transfers 424 the quotation metadata to comparison circuitry 412. Comparison circuitry 412 compares the audio signature of the voice input 400 with audio signature information in the quotation metadata. Control circuitry 404 may establish upper and lower thresholds of similarity for the audio signature as described above. Comparison circuitry 412 may determine whether the audio signature of the voice input 400 falls between the upper and lower thresholds. If comparison circuitry 412 determines that the audio signature of voice input 400 matches audio signature information corresponding to a particular content item, comparison circuitry 412 transmits 426 a signal to output circuitry 428 to generate for display a content recommendation comprising an identifier of the particular content item. Output circuitry 428, which may be a GPU, VGA port, HDMI port, or any other suitable graphical output component, then generates for display 430 a search result comprising an identifier of the particular content item.

Figure 5:
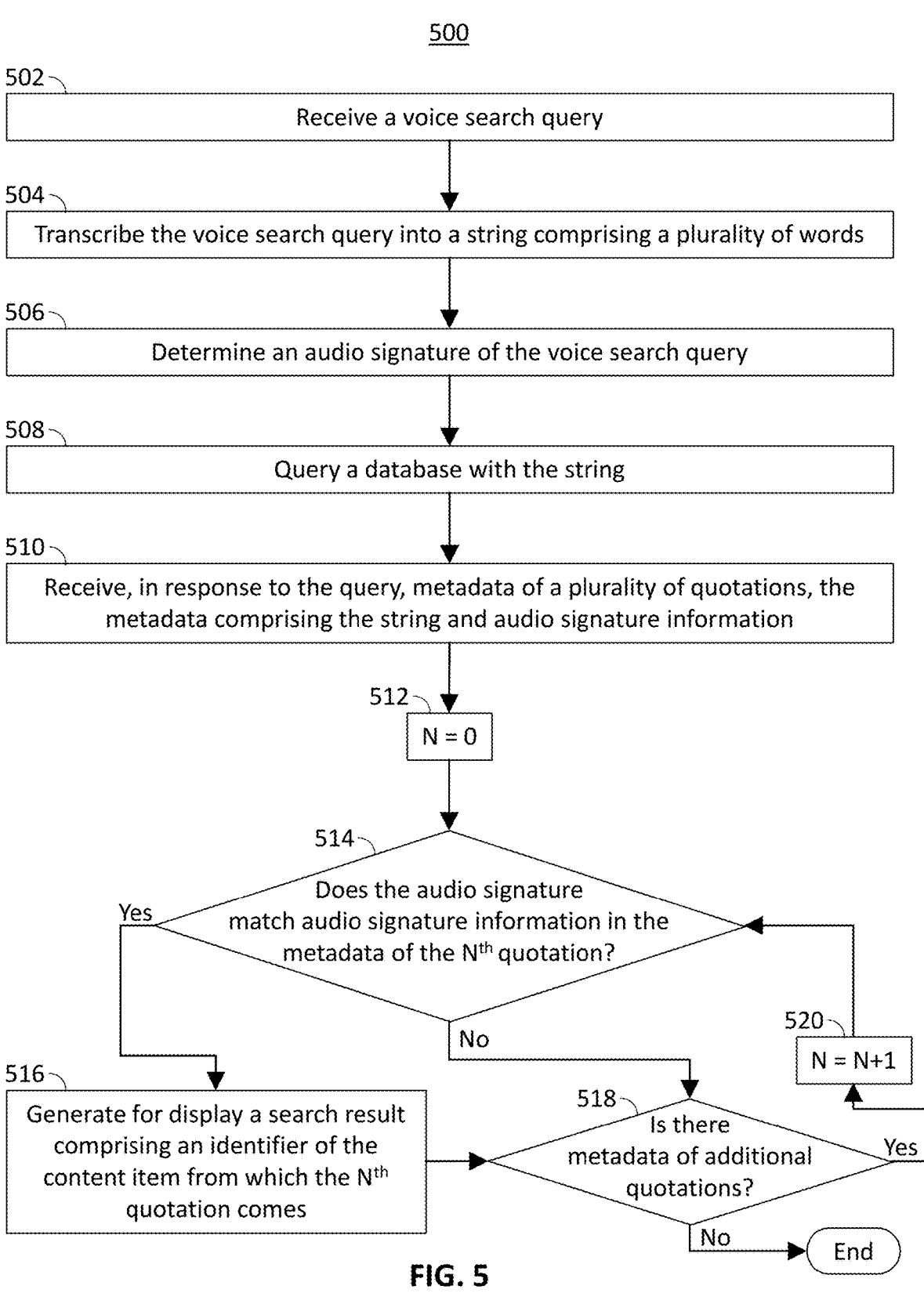
FIG. 5 is a flowchart representing a process for disambiguating a voice search query, in accordance with some embodiments of the disclosure.

FIG. 5 is a flowchart representing an illustrative process 500 for disambiguating a voice search query, in accordance with some embodiments of the disclosure. Process 500 may be implemented on control circuitry 404. In addition, one or more actions of process 500 may be incorporated into or combined with one or more actions of any other process or embodiment described herein.

At 502, control circuitry 404 receives, from input circuitry 402, a voice search query. At 504, control circuitry 404, using transcription circuitry 408, transcribes the voice search query into a string comprising a plurality of words. Transcription circuitry 408 may use any suitable text-to-speech technique to transcribe the voice search query.

At 506, control circuitry 404 determines an audio signature of the voice search query. Control circuitry 404 analyzes the voice search query to identify audio parameters of the voice search query including tone, pitch, word emphasis, word duration, and volume. For example, control circuitry 404 may analyze the wave amplitude of the voice search query to determine the volume at which the user spoke the voice search query. Control circuitry 404 may analyze frequency data of the voice search query to determine the pitch and tone of the voice search query. Control circuitry 404 may isolate a portion of the voice search query corresponding to each of the plurality of words and determine the duration of each portion. Control circuitry 404 may compare each isolated portion of the voice search query to determine the relative level of emphasis placed on each word by the user.

At 508, control circuitry 404 queries the content database with the string. For example, control circuitry 404 may construct and transmit an SQL "SELECT" command to the content database to retrieve quotation metadata of all quotations matching the string, or significant portions thereof. At 510, control circuitry 404 receives, in response to the query, metadata of a plurality of quotations. The metadata includes as audio signature information of the quotation and an identifier of the content item from which the quotation comes.

At 512, control circuitry 404 initializes a counter variable N and sets its value to 0. At 514, control circuitry 404 determines whether the audio signature of the voice search query matches the audio signature information in the metadata of the $N^{th}$ quotation. Methods for determining whether the audio signature is a match are described below in connection with FIGS. 6-10. If the audio signature of the voice search query matches the audio signature information in the metadata of the $N^{th}$ quotation then, at 516, control circuitry 404, using output circuitry 428, generates for display a search result comprising an identifier of the content item from which the $N^{th}$ quotation comes.

If the audio signature of the voice search query does not match the audio signature information in the metadata of the $N^{th}$ quotation, or after generating a search result for the $N^{th}$ quotation, then, at 518, control circuitry 404 determines whether there is metadata of additional quotations available. If so, then, at 520, control circuitry increments the value of counter variable N by one, and processing returns to step 514.

The actions and descriptions of FIG. 5 may be used with any other embodiment of this disclosure. In addition, the actions and descriptions described in relation to FIG. 5 may be done in suitable alternative orders or in parallel to further the purposes of this disclosure.

Figure 6:
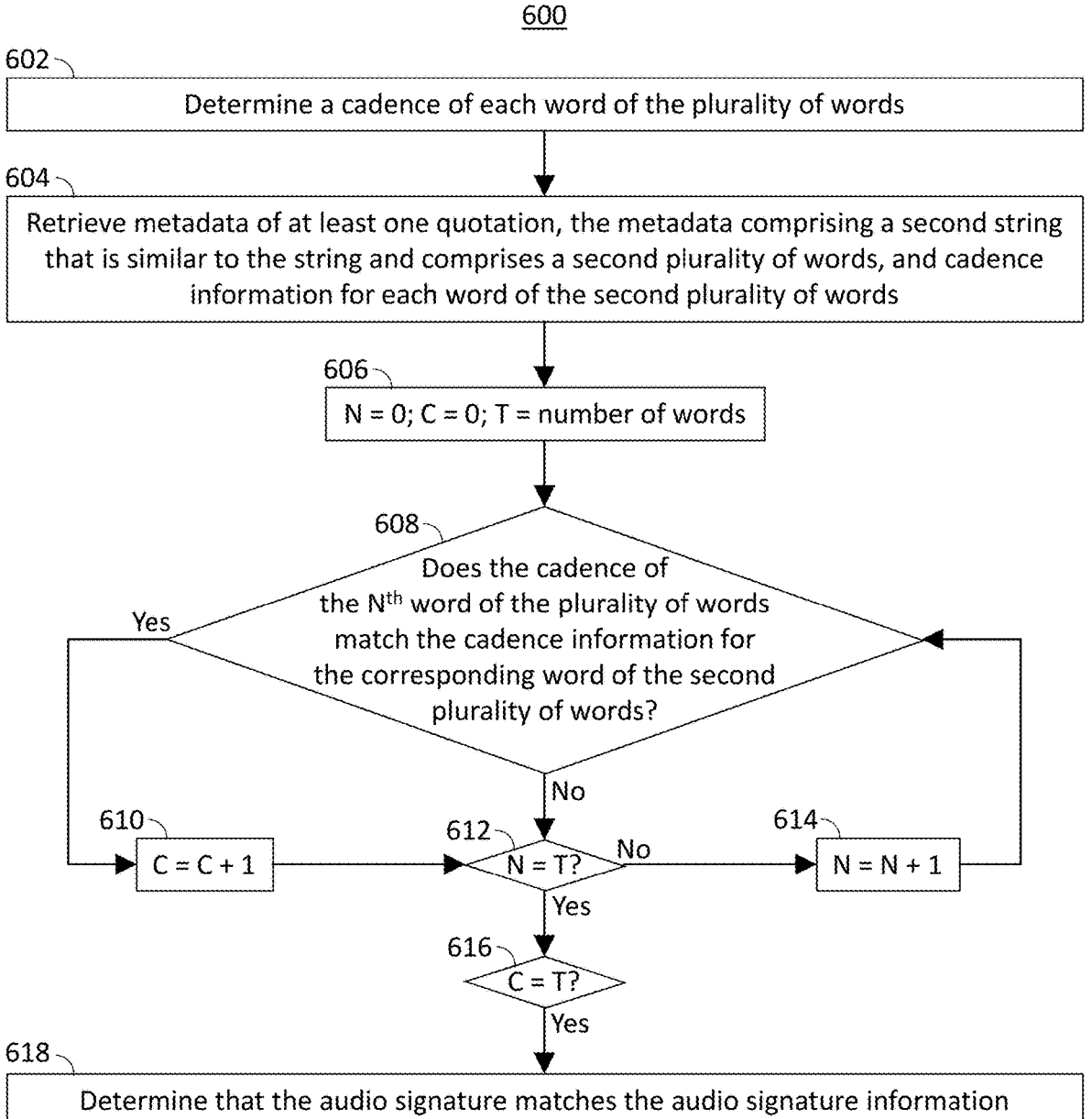
FIG. 6 is a flowchart representing a process for determining whether an audio signature matches audio signature information, in accordance with some embodiments of the disclosure.

FIG. 6 is a flowchart representing an illustrative process 600 for determining whether an audio signature matches audio signature information, in accordance with some embodiments of the disclosure. Process 600 may be implemented on control circuitry 404. In addition, one or more actions of process 600 may be incorporated into or combined with one or more actions of any other process or embodiment described herein.

A cadence of a word can be identified by tracking changes in pitch over time as the word spoken. At 602, control circuitry 404 determines a cadence of each word of the plurality of words. For each word, control circuitry 404 identifies a cadence of the word by analyzing changes in pitch during pronunciation of the word. Control circuitry 404 generates a data structure that tracks the changes in pitch over time for each word.

At 604, control circuitry 404 retrieves metadata of at least one quotation having a string that is similar to the words of the voice search query. The metadata also includes cadence information for each word of the string.

At 606, control circuitry 404 initializes a counter variable N with a value of 0, a second counter variable C with a value of 0, and a variable T with a value equal to the number of words in the string. At 608, control circuitry determines whether the cadence of the $N^{th}$ word matches the cadence information of the corresponding word in the metadata. Methods for determining whether the cadence matches the cadence information are described below in connection with FIG. 11. If the cadence of the $N^{th}$ word matches the cadence information of the corresponding word in the metadata then, at 610, control circuitry increments the value of counter variable C by one. After incrementing the value of C, or if the cadence of the $N^{th}$ word does not match the cadence information, at 612, control circuitry compares N with T to determine whether there are additional words for which cadence information is to be compared. If N is not equal to T, then, at 614, control circuitry 404 increments the value of N by one and processing returns to step 608. If N is equal to T, meaning that the cadence of each word of the voice search query has been compared with cadence information of the corresponding word in the metadata of a quotation, then, at 616, control circuitry determines whether the value of counter variable C, representing the number of words having matching cadences, is equal to T, meaning that the cadences of all words match the cadence information. If so, then, at 618, control circuitry 404 determines that the audio signature of the voice search matches the audio signature information in the metadata of the quotation.

The actions and descriptions of FIG. 6 may be used with any other embodiment of this disclosure. In addition, the actions and descriptions described in relation to FIG. 6 may be done in suitable alternative orders or in parallel to further the purposes of this disclosure.

FIG. 7 is a flowchart representing a second illustrative process 700 for determining whether an audio signature matches audio signature information, in accordance with some embodiments of the disclosure. Process 700 may be implemented on control circuitry 404. In addition, one or more actions of process 700 may be incorporated into or combined with one or more actions of any other process or embodiment described herein.

At 702, control circuitry 404 determines an emphasis of each word of the plurality of words. For each word, control circuitry 404 analyzes the volume of the word relative to other words of the plurality of words. Control circuitry 404 generates a data structure that tracks the changes in volume over time for the plurality of words.

At 704, control circuitry 404 retrieves metadata of at least one quotation having a string that is similar to the words of the voice search query. The metadata also includes emphasis information for each word of the string.

At 706, control circuitry 404 initializes a counter variable N with a value of 0, a second counter variable C with a value of 0, and a variable T with a value equal to the number of words in the string. At 708, control circuitry determines whether the emphasis of the $N^{th}$ word matches the emphasis information of the corresponding word in the metadata. Methods for determining whether the emphasis matches the emphasis information are described below in connection with FIG. 12. If the emphasis of the $N^{th}$ word matches the emphasis information of the corresponding word in the metadata then, at 710, control circuitry 404 increments the value of counter variable C by one. After incrementing the value of C, or if the emphasis of the $N^{th}$ word does not match the emphasis information, at 712, control circuitry 404 compares N with T to determine whether there are additional words for which emphasis information is to be compared. If N is not equal to T then, at 714, control circuitry 404 increments the value of N by one and processing returns to step 708. If N is equal to T, meaning that the emphasis of each word of the voice search query has been compared with emphasis information of the corresponding word in the metadata of a quotation, then, at 716, control circuitry 404 determines whether the value of counter variable C, representing the number of words having matching emphases, is equal to T, meaning that the emphases of all words match the emphasis information. If so then, at 718, control circuitry 404 determines that the audio signature of the voice search matches the audio signature information in the metadata of the quotation.

The actions and descriptions of FIG. 7 may be used with any other embodiment of this disclosure. In addition, the actions and descriptions described in relation to FIG. 7 may be done in suitable alternative orders or in parallel to further the purposes of this disclosure.

FIG. 8 is a flowchart representing a third illustrative process 800 for determining whether an audio signature matches audio signature information, in accordance with some embodiments of the disclosure. Process 800 may be implemented on control circuitry 404. In addition, one or more actions of process 800 may be incorporated into or combined with one or more actions of any other process or embodiment described herein.

At 802, control circuitry 404 determines a duration of each word of the plurality of word. For each word, control circuitry 404 identifies the amount of time taken for the word. Control circuitry 404 generates a data structure that tracks the duration of each word.

At 804, control circuitry 404 retrieves metadata of at least one content item having a string that is similar to the words of the voice search query. The metadata also includes duration information for each word of the string.

At 806, control circuitry 404 initializes a counter variable N with a value of 0, a second counter variable C with a value of 0, and a variable T with a value equal to the number of words in the string. At 808, control circuitry determines whether the duration of the $N^{th}$ word matches the duration information of the corresponding word in the metadata. Methods for determining whether the duration matches the duration information are described below in connection with FIG. 13. If the duration of the $N^{th}$ word matches the duration information of the corresponding word in the metadata, then, at 810, control circuitry 404 increments the value of counter variable C by one. After incrementing the value of C, or if the duration of the $N^{th}$ word does not match the duration information, at 812, control circuitry 404 compares N with T to determine whether there are additional words for which duration information is to be compared. If N is not equal to T, then, at 814, control circuitry 404 increments the value of N by one and processing returns to step 808. If N is equal to T, meaning that the duration of each word of the voice search query has been compared with duration information of the corresponding word in the metadata of a quotation, then, at 816, control circuitry 404 determines whether the value of counter variable C, representing the number of words having matching durations, is equal to T, meaning that the durations of all words match the duration information. If so, then, at 818, control circuitry 404 determines that the audio signature of the voice search matches the audio signature information in the metadata of the quotation.

The actions and descriptions of FIG. 8 may be used with any other embodiment of this disclosure. In addition, the actions and descriptions described in relation to FIG. 8 may be done in suitable alternative orders or in parallel to further the purposes of this disclosure.

Figure 9:
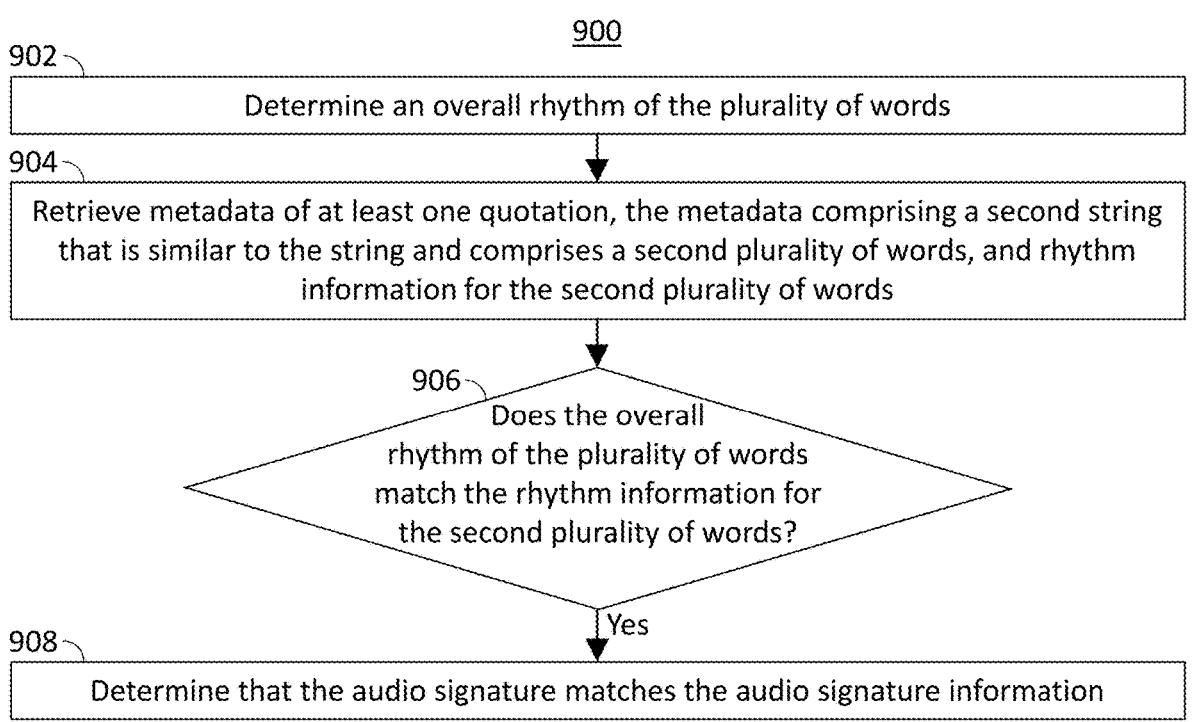
FIG. 9 is a flowchart representing a fourth process for determining whether an audio signature matches audio signature information, in accordance with some embodiments of the disclosure.

FIG. 9 is a flowchart representing a fourth illustrative process 900 for determining whether an audio signature matches audio signature information, in accordance with some embodiments of the disclosure. Process 900 may be implemented on control circuitry 404. In addition, one or more actions of process 900 may be incorporated into or combined with one or more actions of any other process or embodiment described herein.

At 902, control circuitry 404 determines an overall rhythm of the plurality of words. Control circuitry 404 analyzes word duration and word emphasis together to identify a rhythm of the plurality of words. Control circuitry 404 generates a data structure that tracks the rhythm of the plurality of words. At 904, control circuitry 404 retrieves metadata of at least one quotation having a string that is similar to the words of the voice search query. The metadata also includes rhythm information for the string.

At 906, control circuitry determines whether the overall rhythm of the plurality of words matches the rhythm information. Methods for determining whether the rhythm matches the rhythm information are described below in connection with FIG. 14. If control circuitry 404 determines that the overall rhythm of the voice search query matches the rhythm information, then, at 908, control circuitry 404 determines that the audio signature of the voice search query matches the audio signature information in the metadata of the quotation.

The actions and descriptions of FIG. 9 may be used with any other embodiment of this disclosure. In addition, the actions and descriptions described in relation to FIG. 9 may be done in suitable alternative orders or in parallel to further the purposes of this disclosure.

Figure 10:
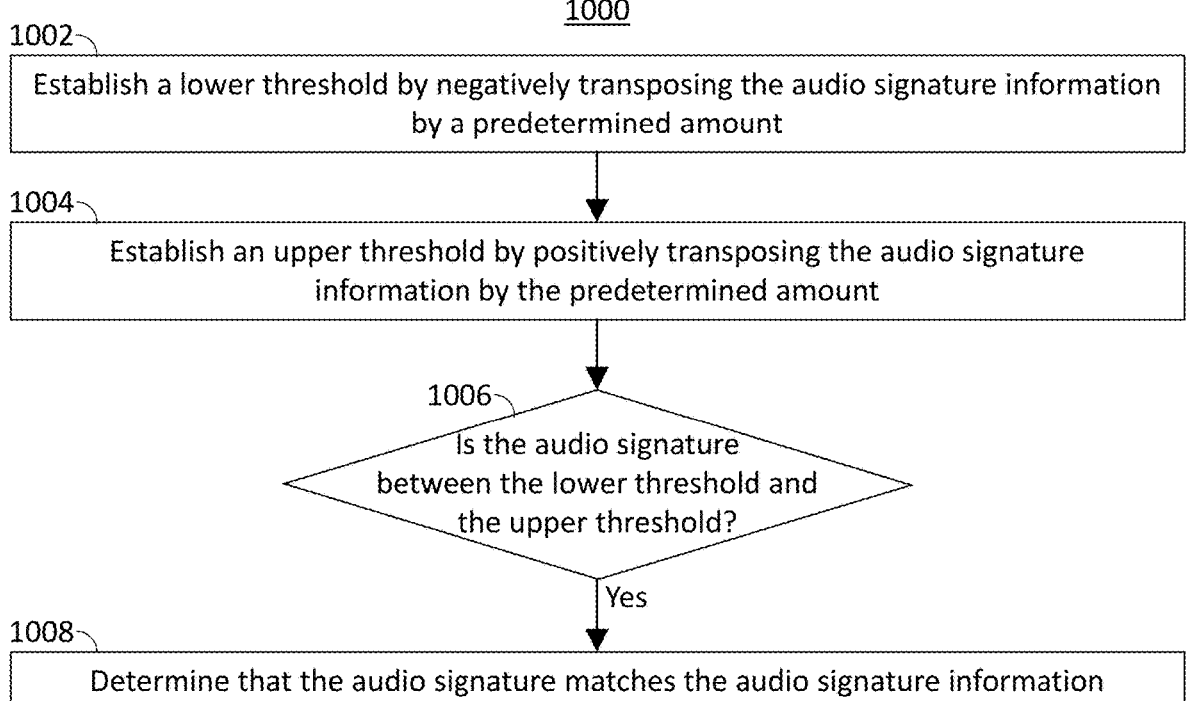
FIG. 10 is a flowchart representing a fifth process for determining whether an audio signature matches audio signature information, in accordance with some embodiments of the disclosure.

FIG. 10 is a flowchart representing a fifth illustrative process 1000 for determining whether an audio signature matches audio signature information, in accordance with some embodiments of the disclosure. Process 1000 may be implemented on control circuitry 404. In addition, one or more actions of process 1000 may be incorporated into or combined with one or more actions of any other process or embodiment described herein.

At 1002, control circuitry 404 establishes a lower audio signature similarity threshold by negatively transposing (i.e., decrease the value of each parameter) the audio signature information in the metadata of a quotation by a predetermined amount. For example, control circuitry may reduce the volume, word duration, emphasis, pitch, tone, and other parameters comprising the audio signature by 25%. At 1004, control circuitry 404 similarly establishes an upper audio signature similarity threshold by positively transposing (i.e., increasing the value of each parameter) the audio signature information in the metadata of a quotation by the same predetermined amount.

At 1006, control circuitry 404 determines whether the audio signature of the voice search query is between the lower and upper thresholds. Control circuitry 404 may analyze the audio signature as a whole or may determine whether each individual parameter is between the corresponding parameter value of the lower and upper thresholds. If the audio signature of the voice search query is between the lower and upper thresholds, then, at 1008, control circuitry 404 determines that the audio signature matches the audio signature information in the metadata of the quotation.

The actions and descriptions of FIG. 10 may be used with any other embodiment of this disclosure. In addition, the actions and descriptions described in relation to FIG. 10 may be done in suitable alternative orders or in parallel to further the purposes of this disclosure.

FIG. 11 is a flowchart representing an illustrative process 1100 for determining whether a cadence of each word of a plurality of words matches cadence information for each corresponding word of a second plurality of words, in accordance with some embodiments of the disclosure. Process 1100 may be implemented on control circuitry 404. In addition, one or more actions of process 1100 may be incorporated into or combined with one or more actions of any other process or embodiment described herein.

At 1102, control circuitry 404 establishes a lower cadence similarity threshold by negatively modulating the cadence information for each word in the metadata of a quotation by a predetermined amount. As described above, cadence information is represented by a change in pitch over time for each word. Control circuitry 404 modulates the change in pitch to a smaller change in pitch by a predetermined amount, such as 25%. Similarly, at 1104, control circuitry 404 establishes an upper cadence similarity threshold by positively modulating the cadence information for each word by the predetermined amount.

At 1106, control circuitry 404 initializes a counter variable N with a value of 0, a second counter variable C with a value of 0, and a variable T with a value equal to the number of words in the string. At 1108, control circuitry determines whether the cadence of the $N^{th}$ word is between the upper and lower cadence similarity thresholds of the corresponding word in the metadata. If the cadence of the $N^{th}$ word is between the upper and lower thresholds of the corresponding word in the metadata then, at 1110, control circuitry 404 increments the value of counter variable C by one. After incrementing the value of C, or if the cadence of the $N^{th}$ word is not between the upper and lower thresholds then, at 1112, control circuitry 404 compares N with T to determine whether there are additional words for which cadence information is to be compared. If N is not equal to T then, at 1114, control circuitry 404 increments the value of N by one and processing returns to step 1108. If N is equal to T, meaning that the cadence of each word of the voice search query has been compared with the upper and lower thresholds of the corresponding words in the metadata of a quotation, then, at 1116, control circuitry 404 determines whether the value of counter variable C, representing the number of words having cadences between their respective upper and lower thresholds, is equal to T, meaning that the cadences of all words are between their respective upper and lower thresholds. If so, then, at 1118, control circuitry 404 determines that the cadence of each word matches the cadence information for each corresponding word in the metadata of the quotation.

The actions and descriptions of FIG. 11 may be used with any other embodiment of this disclosure. In addition, the actions and descriptions described in relation to FIG. 11 may be done in suitable alternative orders or in parallel to further the purposes of this disclosure.

Figure 12:
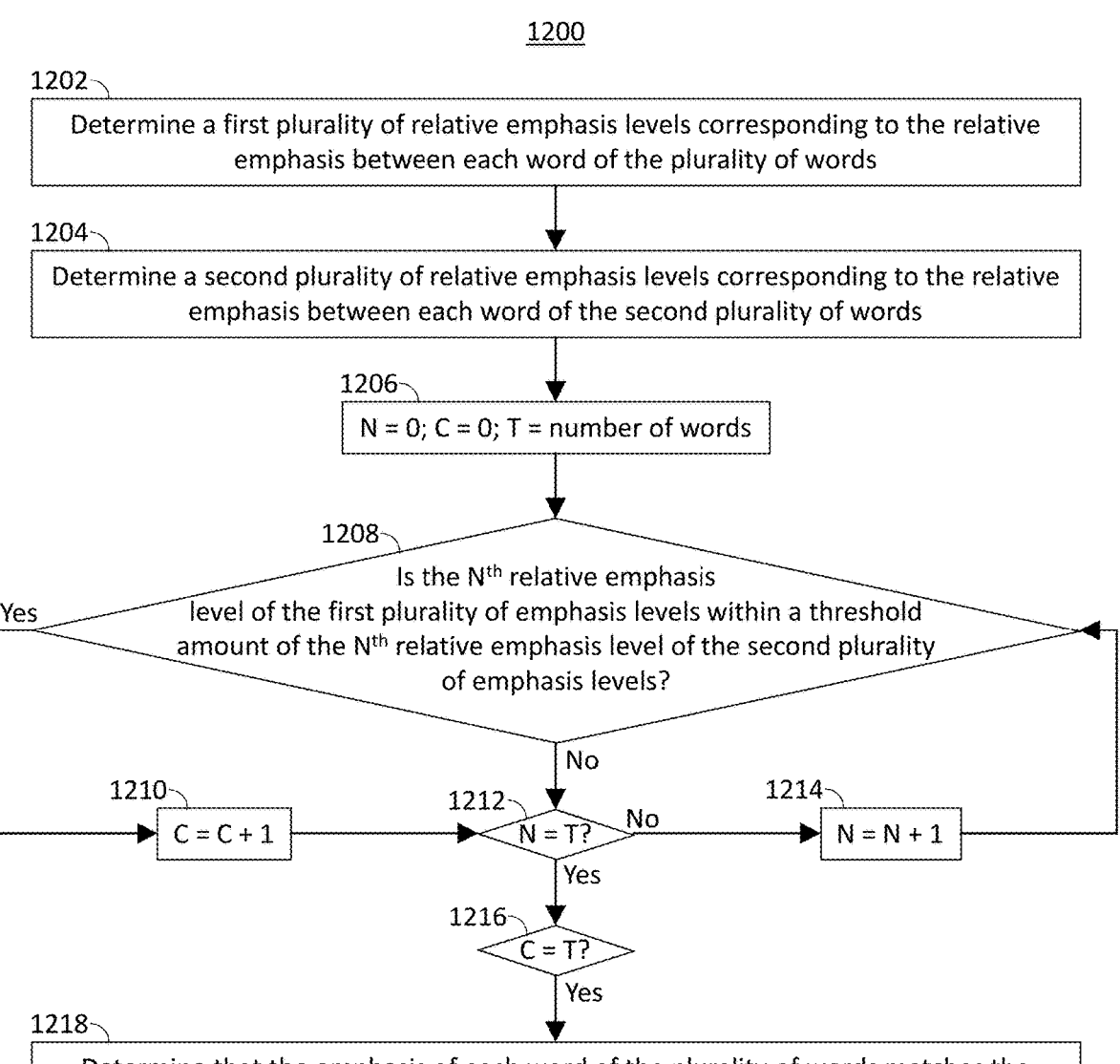
FIG. 12 is a flowchart representing a process for determining whether a relative emphasis of each word of a plurality of words matches relative emphasis information for each corresponding word of a second plurality of words, in accordance with some embodiments of the disclosure.

FIG. 12 is a flowchart representing an illustrative process 1200 for determining whether a relative emphasis of each word of a plurality of words matches relative emphasis information for each corresponding word of a second plurality of words, in accordance with some embodiments of the disclosure. Process 1200 may be implemented on control circuitry 404. In addition, one or more actions of process 1200 may be incorporated into or combined with one or more actions of any other process or embodiment described herein.

At 1202, control circuitry 404 determines a first plurality of relative emphasis levels corresponding to the relative emphasis between each word of the plurality of words. As discussed above, control circuitry 404 analyzes a volume of each word of the voice search query and determines a relative volume level for each word, with louder words having greater emphasis. At 1204, control circuitry 404 determines a second plurality of relative emphasis levels between each word in the metadata of a quotation. Control circuitry 404 may retrieve emphasis information from the metadata or determine relative emphasis levels for each word based on other audio information such as volume information in the metadata of the quotation.

At 1206, control circuitry 404 initializes a counter variable N with a value of 0, a second counter variable C with a value of 0, and a variable T with a value equal to the number of words in the string. At 1208, control circuitry determines whether the $N^{th}$ relative emphasis level of the first plurality of emphasis levels is within a threshold amount of the $N^{th}$ relative emphasis level of the second plurality of emphasis levels. For example, control circuitry 404 determines whether the change in relative emphasis level between two words in the voice search query is within 25% of the change in relative emphasis level between the same two words in the metadata of the quotation. If the $N^{th}$ relative emphasis level of the first plurality of emphasis levels is within the threshold amount of the $N^{th}$ relative emphasis level of the second plurality of emphasis levels, then, at 1210, control circuitry 404 increments the value of counter variable C by one. After incrementing the value of C, or if the cadence of the $N^{th}$ word is not between the upper and lower thresholds then, at 1212, control circuitry 404 compares N with T to determine whether there are additional words for which cadence information is to be compared. If N is not equal to T, then, at 1214, control circuitry 404 increments the value of N by one and processing returns to step 1208. If N is equal to T, meaning that the each relative emphasis level of the first plurality of emphasis levels is within the threshold amount of the corresponding emphasis levels of the second plurality of emphasis levels, then, at 1216, control circuitry 404 determines whether the value of counter variable C, representing the number of relative emphasis levels of the first plurality of emphasis levels within the threshold amount of the corresponding emphasis levels of the second plurality of emphasis levels, is equal to T. If so, then, at 1218, control circuitry 404 determines that the emphasis of each word matches the emphasis information for each corresponding word in the metadata of the quotation.

The actions and descriptions of FIG. 12 may be used with any other embodiment of this disclosure. In addition, the actions and descriptions described in relation to FIG. 12 may be done in suitable alternative orders or in parallel to further the purposes of this disclosure.

FIG. 13 is a flowchart representing an illustrative process 1300 for determining whether a duration of each word of a plurality of words matches duration information for each corresponding word of a second plurality of words, in accordance with some embodiments of the disclosure. Process 1300 may be implemented on control circuitry 404. In addition, one or more actions of process 1300 may be incorporated into or combined with one or more actions of any other process or embodiment described herein.

At 1302, control circuitry 404 establishes a lower duration similarity threshold by reducing the duration information for each word in the metadata of a quotation by a predetermined amount, such as 25%. Similarly, at 1304, control circuitry 404 establishes an upper duration similarity threshold by increasing the duration information for each word by the predetermined amount.

At 1306, control circuitry 404 initializes a counter variable N with a value of 0, a second counter variable C with a value of 0, and a variable T with a value equal to the number of words in the string. At 1308, control circuitry determines whether the duration of the N$^{th}$ word is between the upper and lower duration similarity thresholds of the corresponding word in the metadata. If the duration of the N$^{th}$ word is between the upper and lower thresholds of the corresponding word in the metadata then, at 1310, control circuitry 404 increments the value of counter variable C by one. After incrementing the value of C, or if the duration of the N$^{th}$ word is not between the upper and lower thresholds, then, at 1312, control circuitry 404 compares N with T to determine whether there are additional words for which duration information is to be compared. If N is not equal to T, then, at 1114, control circuitry 404 increments the value of N by one and processing returns to step 1108. If N is equal to T, meaning that the duration of each word of the voice search query has been compared with the upper and lower thresholds of the corresponding words in the metadata of a quotation, then, at 1316, control circuitry 404 determines whether the value of counter variable C, representing the number of words having durations between their respective upper and lower thresholds, is equal to T, meaning that the durations of all words are between their respective upper and lower thresholds. If so, then, at 1318, control circuitry 404 determines that the duration of each word matches the duration information for each corresponding word in the metadata of the quotation.

The actions and descriptions of FIG. 13 may be used with any other embodiment of this disclosure. In addition, the actions and descriptions described in relation to FIG. 13 may be done in suitable alternative orders or in parallel to further the purposes of this disclosure.

FIG. 14 is a flowchart representing an illustrative process 1400 for determining whether the overall rhythm of a plurality of words matches rhythm information for a second plurality of words, in accordance with some embodiments of the disclosure. Process 1400 may be implemented on control circuitry 404. In addition, one or more actions of process 1400 may be incorporated into or combined with one or more actions of any other process or embodiment described herein.

At 1402, control circuitry 404 establishes a lower rhythm similarity threshold by negatively modulating the rhythm information by a predetermined amount, such as 25%. For example, control circuitry 404 may reduce the duration and relative emphasis parameters of each word by the predetermined amount. Similarly, at 1404, control circuitry 404 establishes an upper rhythm similarity threshold by positively modulating the rhythm information by the predetermined amount.

At 1406, control circuitry 404 determines whether the overall rhythm of the voice search query is between the upper and lower rhythm similarity thresholds. Control circuitry 404 may compare the rhythm as a whole, or each individual rhythm parameter, with the upper and lower thresholds. If the overall rhythm is between the upper and lower thresholds, then, at 1408, control circuitry 404 determines that the overall rhythm of the plurality of words matches the rhythm information in the metadata of the quotation.

The actions and descriptions of FIG. 14 may be used with any other embodiment of this disclosure. In addition, the actions and descriptions described in relation to FIG. 14 may be done in suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
receiving a voice search query comprising a first plurality of words;
determining a first plurality of audio parameters for the voice search query, wherein a first audio parameter of the first plurality of audio parameters is associated with at least one word of the first plurality of words;
identifying metadata of a quotation based on the voice search query, wherein:
the quotation comprises a second plurality of words;
the metadata comprises a second plurality of audio parameters for the quotation; and
a first audio parameter of the second plurality of audio parameters is associated with at least one word of the second plurality of words;
determining that at least a portion of the voice search query matches at least a portion of the quotation in response to comparing the first plurality of audio parameters with the second plurality of audio parameters; and
generating for display a search result comprising an identifier of a content item associated with the quotation.

2. The method of claim 1, wherein one or more of the first plurality of audio parameters and one or more of the second plurality of audio parameters correspond to a volume level.

3. The method of claim 1, wherein one or more of the first plurality of audio parameters and one or more of the second plurality of audio parameters correspond to a duration.

4. The method of claim 1, wherein one or more of the first plurality of audio parameters and one or more of the second plurality of audio parameters correspond to an emphasis level.

5. The method of claim 1, wherein one or more of the first plurality of audio parameters and one or more of the second plurality of audio parameters correspond to a tone.

6. The method of claim 1, wherein one or more of the first plurality of audio parameters and one or more of the second plurality of audio parameters correspond to a speed measurement.

7. An apparatus, comprising:
control circuitry; and
at least one memory including computer program code for one or more programs, the at least one memory and the computer program code configured to, with the control circuitry, cause the apparatus to perform at least the following:
receive a voice search query comprising a first plurality of words;

determine a first plurality of audio parameters for the voice search query, wherein a first audio parameter of the first plurality of audio parameters is associated with at least one word of the first plurality of words;

identify metadata of a quotation based on the voice search query, wherein:

the quotation comprises a second plurality of words;

the metadata comprises a second plurality of audio parameters for the quotation; and a first audio parameter of the second plurality of audio parameters is associated with at least one word of the second plurality of words;

determine that at least a portion of the voice search query matches at least a portion of the quotation in response to comparing the first plurality of audio parameters with the second plurality of audio parameters; and generate for display a search result comprising an identifier of a content item associated with the quotation.

8. The apparatus of claim 7, wherein one or more of the first plurality of audio parameters and one or more of the second plurality of audio parameters correspond to a volume level.

9. The apparatus of claim 7, wherein one or more of the first plurality of audio parameters and one or more of the second plurality of audio parameters correspond to a duration.

10. The apparatus of claim 7, wherein one or more of the first plurality of audio parameters and one or more of the second plurality of audio parameters correspond to an emphasis level.

11. The apparatus of claim 7, wherein one or more of the first plurality of audio parameters and one or more of the second plurality of audio parameters correspond to a tone.

12. The apparatus of claim 7, wherein one or more of the first plurality of audio parameters and one or more of the second plurality of audio parameters correspond to a speed measurement.

13. A non-transitory computer-readable medium having instructions encoded thereon that, when executed by control circuitry, cause the control circuitry to:

receive a voice search query comprising a first plurality of words;

determine a first plurality of audio parameters for the voice search query, wherein a first audio parameter of the first plurality of audio parameters is associated with at least one word of the first plurality of words;

identify metadata of a quotation based on the voice search query, wherein:

the quotation comprises a second plurality of words;

the metadata comprises a second plurality of audio parameters for the quotation; and a first audio parameter of the second plurality of audio parameters is associated with at least one word of the second plurality of words;

determine that at least a portion of the voice search query matches at least a portion of the quotation in response to comparing the first plurality of audio parameters with the second plurality of audio parameters; and generate for display a search result comprising an identifier of a content item associated with the quotation.

14. The non-transitory computer-readable medium of claim 13, wherein one or more of the first plurality of audio parameters and one or more of the second plurality of audio parameters correspond to a volume level.

15. The non-transitory computer-readable medium of claim 13, wherein one or more of the first plurality of audio parameters and one or more of the second plurality of audio parameters correspond to a duration.

16. The non-transitory computer-readable medium of claim 13, wherein one or more of the first plurality of audio parameters and one or more of the second plurality of audio parameters correspond to an emphasis level.

17. The non-transitory computer-readable medium of claim 13, wherein one or more of the first plurality of audio parameters and one or more of the second plurality of audio parameters correspond to a tone.

18. The non-transitory computer-readable medium of claim 13, wherein one or more of the first plurality of audio parameters and one or more of the second plurality of audio parameters correspond to a speed measurement.

\* \* \* \* \*